Feb. 23, 1926.

P. S. MORGAN

POWER BRAKE

Original Filed Oct. 7, 1919

1,574,253

INVENTOR
Porter S. Morgan.
BY his
ATTORNEY
Thomas Veitch.

Patented Feb. 23, 1926.

1,574,253

UNITED STATES PATENT OFFICE.

PORTER S. MORGAN, OF NORWALK, CONNECTICUT, ASSIGNOR TO ROTARY BRAKE COMPANY, INC., OF NEW YORK, N. Y., A CORPORATION.

POWER BRAKE.

Application filed October 7, 1919, Serial No. 328,974. Renewed May 8, 1923.

*To all whom it may concern:*

Be it known that I, PORTER S. MORGAN, a citizen of the United States, and a resident of Norwalk, in the county of Fairfield and State of Connecticut, have invented certain new and useful Improvements in Power Brakes, of which the following is a specification.

My invention relates to primary and secondary brakes or to brakes in which the primary brake, actuated by hand, in turn actuates the secondary brake through the power of the moving brake drum.

There are three types of band brakes; the full wrap, the full unwrap and the half or partial unwrap and wrap. The first type is very powerful but has a tendency to jam or lock, the second type requires a great deal of pressure to actuate it but is very smooth and gradual in its action and will not jam; the third type, half wrap and half unwrap, is most generally used for motor vehicles as it operates equally well in both directions.

Primary and secondary or power actuated brakes are perfect in theory but have the bad fault in practice that, if applied quickly, all sense of control is lost and the brakes jam or lock with disastrous results; very bad for all machinery but positively dangerous for motor vehicles, causing skidding or overturning.

The object of my invention is to provide a primary and secondary brake that will not jam or lock in case it is applied suddenly, by arranging the secondary brake band to partially or fully unwrap, which, by opposing the primary brake, tends to effect a balancing of the system.

The above enumerated objects and others that will later on appear are now to be described and are illustrated in the accompanying drawing forming part of this specification.

Figure 2:
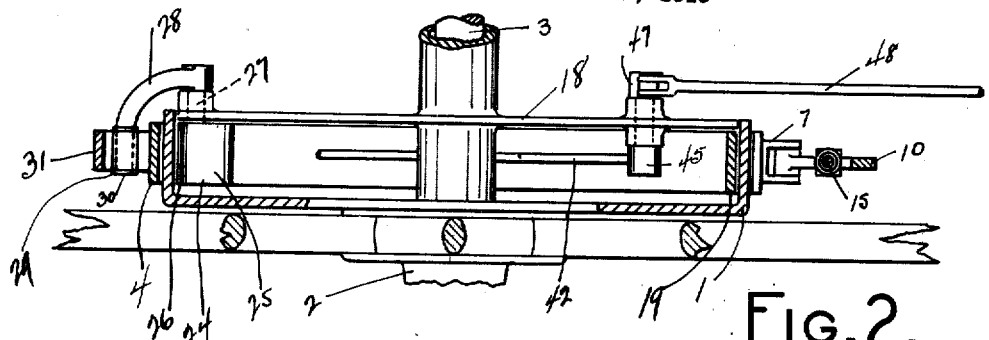
Figure 1:
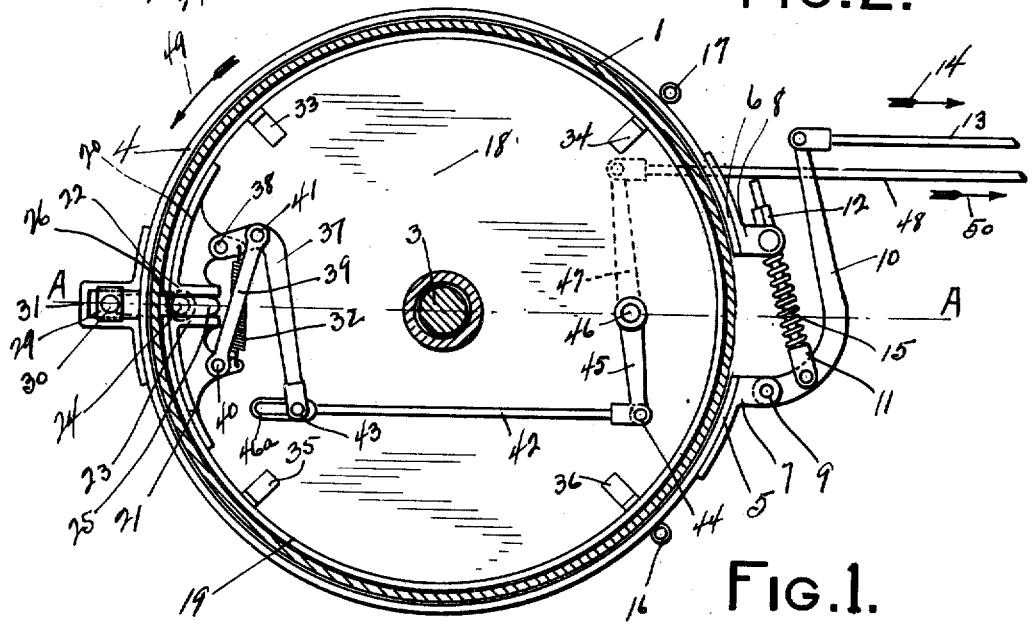
Figure 3:
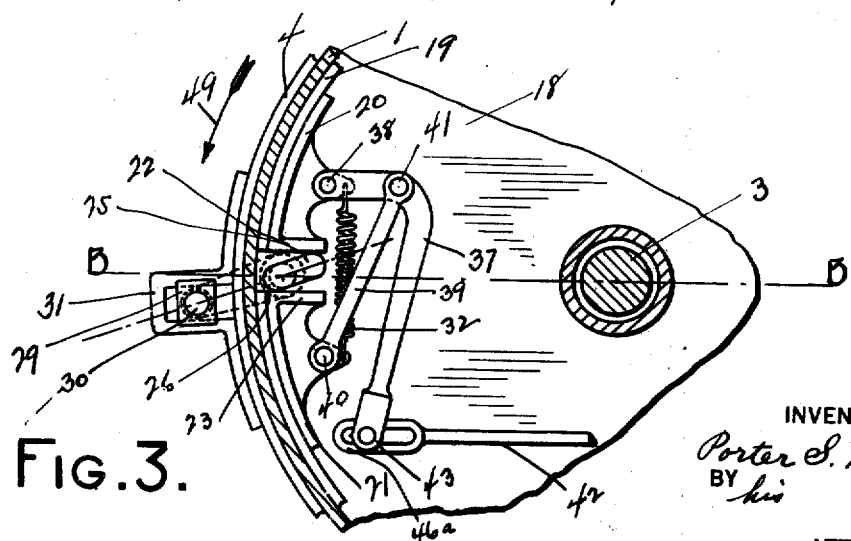

Similar characters of reference denote like or corresponding parts throughout the several views, of which Fig. 1 is a side elevation of my invention applied to a motor vehicle brake drum, the vehicle wheel and part of the drum being removed to clearly show the parts, Fig. 2 is a plan view thereof, in part a horizontal cross section on the line A—A of Fig. 1, and Fig. 3 is an enlarged view of the secondary brake operating mechanism in the act of being set.

Referring particularly to Figs. 1 and 2 of the drawings, the numeral 1 denotes a brake drum, secured to the wheel hub 2, which is keyed or otherwise fastened to the axle 3. Surrounding the brake drum, but not touching it, is the primary brake band 4, formed preferably from a single strip of metal and lined with brake lining. To the ends 5 and 6 of the primary brake band 4 are attached lugs 7 and 8. A bent lever 10 is pivoted in lug 7 at 9 and is also connected to the other lug 8 by the eye rod 11 and the take up nut 12. The upper end of the lever 10 is connected through the eye rod 13, preferably, to a foot pedal (not shown), adapted to move the rod 13 in the direction of the arrow 14 to contract the brake band 4 and apply the same to the drum 1. When brake band 4 is released its ends are separated by a spring 15 and the band is centered by the roller clips 16 and 17, secured to the stationary brake spider 18.

The secondary brake 19 is formed, preferably, from a single metal strip and lined with brake lining. To its ends are secured, by riveting or otherwise, the lugs 20 and 21. These have flat parallel faces 22 and 23, resting in contact with the operating cam 24. This cam is quite different from the ordinary brake cam in that it is unsymmetrical or has unequal arms 25 and 26, extending from the axis of the spindle 27. The cam spindle 27 is secured to a lever 28, having a square block 29 loosely mounted on its end 30. The block 29 serves as an anchor for the outer brake band. It also cooperates with the pivoted lever 28, serving as means for expanding the inner brake band. This square block is in line with the primary band 4 and is adapted to slide in a slot of the yoke 31, which is riveted or securely fastened to the band 4. When the brake is released, a spring 32 attached to the lugs 20 and 21 draws the ends of the band 19 toward each other and forces the cam 24 and the lever 28 into the position shown in Fig. 1, at the same time centering the band 19 on the angle pieces 33, 34, 35, and 36 secured to the spider 18.

The ends of the secondary brake are separated manually and the brake thus applied through the bent lever 37, pivoted at 38 to lug 20; the links 39 connecting the bent lever at 41, to the lug 21 at 40; the rod 42 connecting the lower end 43 of lever 37 with end 44 of the lever 45, attached to a shaft 46 which is journalled in the spider 18; a lever 47, secured to the outer end of shaft 46, and a rod 48 connecting the lever 47 with a hand lever convenient to the operator, but not shown. The purpose of the slot 46ª in the end of the rod 42 is to permit the lever 37 to move without moving the rod 42 when the cam 24 is rotated.

The action of my brake is as follows; assuming that both primary and secondary brakes are free, as shown in Fig. 1, and that the drum 1 is rotating in the direction of the arrow 49, then, if the foot lever is moved and with it the rod 13 in the direction of the arrow 14, the ends of the primary brake band 4 will be drawn toward each other and the brake brought into frictional contact with the rotating drum. Due to this contact, there is a small angular rotation of the entire primary brake band together with the yoke 31, the lever 28 and the cam 24 in the direction of the arrow 49; these assuming approximately the positions shown in Fig. 3. An examination of this figure will show that the cam 24 in rotating has applied the secondary brake 19 by moving the end attached to lug 20 upward or in a direction opposite to the direction of rotation of the drum 1 and that the end attached to lug 21 has been moved downward but a fraction of the distance moved by the other end of the brake band 19. The above movement is that of an "unwrap" brake and it will not jam or lock however quickly it is applied. If the drum was rotating in a direction opposite to that of the arrow 49, the yoke 31 would be moved upward or above the centre line B B and the cam would cause the brake end or lug 21 to move downward against the rotation of the drum, producing the same action as before. When the secondary brake is operated manually, through moving the rod 48 in the direction of the arrow 50, the ends attached to lugs 20 and 21 will be separated and the brake applied, whereupon the brake band will rotate with the drum until one lug (either 20 or 21) comes into contact with the cam 24 and the band then becomes a "wrap up" brake, having ample power and operating in either direction equally well.

Another great advantage of my invention is that the primary brake is equally effective for both directions of rotation and this, combined with a secondary brake opposing the rotation of the drum to produce a counterbalancing effect, gives a brake that is practically self-governing for all drum speeds and varying coefficients of friction.

The cam lends itself to a perfect balancing of the brakes to meet all operating conditions and for all different installations, thus meeting varying conditions perfectly.

Having thus described and illustrated my invention so that anyone skilled in the art may make and construct the same and without limiting myself to the definite arrangement and construction of parts as shown, I claim:

1. A brake comprising a rotary drum, an inner secondary brake band and an outer primary brake band both manually operated and adapted for angular rotation with the rotary drum, an unsymmetrical cam disposed between the ends of the secondary brake band, and means connecting the cam with the primary brake band for effecting an angular rotation of the said cam when the primary brake band moves with the rotary drum.

2. A brake comprising a rotary drum, an inner secondary brake band and an outer primary brake band both manually operated and adapted for angular rotation with the rotary drum, an unsymmetrical cam disposed between the ends of the secondary brake band, and means connecting the cam with the primary brake band for effecting an angular rotation of the said cam together with an unwrap setting of the secondary brake band when the primary brake band moves with the rotary drum.

3. A brake comprising a rotary drum, an inner secondary brake band and an outer primary brake band both manually operated and adapted for angular rotation with the rotary drum, an unequal arm cam disposed between the ends of the secondary brake band, and a single lever connecting the cam with the primary brake band for effecting an angular rotation of the said cam when the primary brake band moves with the rotary drum.

4. A brake comprising a rotary drum and inner and outer brake bands adapted to frictionally engage the same, a cam operatively connected with said outer brake band disposed between the ends of the inner brake band and adapted to move the ends of the said inner brake band to different distances when the said cam is angularly rotated by the movement of said outer brake band.

5. A brake comprising a rotary drum and inner and outer brake bands adapted to frictionally engage the same and to angularly rotate therewith, a cam disposed between the ends of the inner brake band and adapted to move the said ends to different distances when the cam is angularly rotated, and lever means connecting the said cam with the outer brake band.

6. A brake comprising a rotary drum and manually operated inner and outer brake bands adapted to frictionally engage the same and to angularly rotate therewith, a cam disposed between the ends of the inner brake band and adapted to move the said ends to different distances when the cam is angularly rotated, and lever means connecting the said cam with the outer brake band.

7. A brake comprising a rotary drum and manually operated inner and outer bands adapted to frictionally engage the same and to angularly rotate therewith, an unsymmetrical cam disposed between the ends of the inner brake band and adapted to move the said ends to different distances when the cam is angularly rotated, and lever means connecting the said cam with the outer brake band.

8. A brake of the character described comprising a rotatable brake drum, a braking element operating against one face of said drum, a circular brake band cooperating with the opposite face of said drum, means to actuate the said braking element to cause it to engage the brake drum with a braking action, and means actuated by said braking element to cause the circular brake band to engage the drum with a full unwrap action.

9. A brake of the character described comprising a rotatable brake drum, a braking element operating against one face of said drum, a circular brake band cooperating with the opposite face of said drum, means to actuate the said braking element to cause it to engage the brake drum with a braking action, and means actuated by said braking element to cause the circular brake band to engage the drum with a full unwrap action, together with a second means for actuating the circular brake band independently of the said braking element to cause it to engage the brake drum.

10. A brake of the character described comprising a rotatable drum, outer and inner brake bands cooperating therewith, means to actuate one brake band to engage said brake drum with a braking action, means controlled by the braking action of the one brake band for actuating one end of the other brake band with a full unwrap braking action, together with means tending to hold the other end of said other band in substantially fixed position.

11. A brake of the character described comprising a rotatable drum, outer and inner brake elements engaging said drum and cooperating therewith, one of said elements consisting of a circular brake band, means operatively connected with the other of said brake elements for actuating said circular brake band with a full unwrap action.

12. A brake of the character described comprising a rotatable drum, outer and inner brake elements engaging said drum and cooperating therewith, one of said elements consisting of a circular brake band, means operatively connected with the other of said brake elements for actuating said circular brake band, the actuating means and the resistance of the braking action of said circular band opposing each other.

13. A brake of the character described comprising a rotatable drum, outer and inner circular brake bands engaging said drum and cooperating therewith, means tending to hold one end of one of said circular brake bands in substantially fixed position, means controlled by the other brake band engaging the opposite end thereof to actuate the same to cause it to engage the brake drum.

14. A brake of the character described comprising a rotatable drum, an outer brake band encircling said drum, means to actuate said outer band with a part wrap and part unwrap action, the inner band floating free except at its ends, means engaging said outer band intermediate its ends and actuated thereby arranged to expand the inner brake band with a force increasing as the braking force of the outer band increases.

15. A brake of the character described, comprising a rotatable drum, outer and inner brake bands engaging said drum and cooperating therewith, means tending to hold one end of one of said brake bands in relatively fixed position, actuating means cooperating with the other end of said brake band to apply the same to the rotatable drum, said means being controlled entirely by the other brake band.

16. A brake of the character described comprising a rotatable drum, an outer brake element, an inner circular brake band, means to actuate the outer brake element, means controlled by the outer brake element for actuating the inner brake band to expand the same, the inner brake band floating free except at its ends.

17. A brake of the character described comprising a rotatable brake drum, an outer brake band encircling said drum, a movable anchor member engaging said band intermediate its ends, operating means engaging said band at its ends, an inner circular brake band cooperating with the inner face of said drum, means for anchoring one end of said inner band and means for actuating the other end of said inner band, said last means being operatively connected with said movable anchor member.

18. A brake of the character described comprising a rotatable drum, outer and inner brake bands engaging said drum and cooperating therewith, one of said brake bands being anchored against circumferential movement at its ends only, spring means holding said band free of braking engagement with the drum, operating means for causing the band to engage the brake drum with a braking action, said means being connected with the other brake band to be controlled thereby and a primary operating device to cause the other brake band to engage the brake drum with a braking action.

19. A brake of the character described comprising a rotatable brake drum, an outer circular brake band cooperating with the operating means therefor, an inner integral circular brake band cooperating with the inner face of said drum, means operable independently of the aforesaid operating means engaging the outer brake band intermediate its ends and actuated thereby to expand the inner brake band to cause it to engage the drum with a braking action 20. A brake of the character described comprising a brake drum; a primary brake band and a secondary brake band engaging said brake drum, means to operate the primary brake band only to cause it to engage the brake drum with a part wrap and a part unwrap action; means independent of the first mentioned means controlled by the primary brake band for actuating the secondary brake band.

21. A brake of the character described comprising a brake drum; a primary brake band and a secondary brake band engaging said brake drum; means to operate the primary brake band only to cause it to engage the brake drum with a part wrap and a part unwrap action; means independent of the first mentioned means controlled by the primary brake band for actuating the secondary brake band; together with separate means for actuating the secondary brake band only.

Signed at New York in the county of New York and State of New York this 29th day of September A. D. 1919.

PORTER S. MORGAN.

vice to cause the other brake band to engage the brake drum with a braking action.

19. A brake of the character described comprising a rotatable brake drum, an outer circular brake band cooperating with the operating means therefor, an inner integral circular brake band cooperating with the inner face of said drum, means operable independently of the aforesaid operating means engaging the outer brake band intermediate its ends and actuated thereby to expand the inner brake band to cause it to engage the drum with a braking action.

20. A brake of the character described comprising a brake drum; a primary brake band and a secondary brake band engaging said brake drum, means to operate the primary brake band only to cause it to engage the brake drum with a part wrap and a part unwrap action; means independent of the first mentioned means controlled by the primary brake band for actuating the secondary brake band.

21. A brake of the character described comprising a brake drum; a primary brake band and a secondary brake band engaging said brake drum; means to operate the primary brake band only to cause it to engage the brake drum with a part wrap and a part unwrap action; means independent of the first mentioned means controlled by the primary brake band for actuating the secondary brake band; together with separate means for actuating the secondary brake band only.

Signed at New York in the county of New York and State of New York this 29th day of September A. D. 1919.

PORTER S. MORGAN.

Certificate of Correction.

It is hereby certified that in Letters Patent No. 1,574,253, granted February 23, 1926, upon the application of Porter S. Morgan, of Norwalk, Connecticut, for an improvement in "Power Brakes," an error appears in the printed specification requiring correction as follows: Page 4, line 5, claim 19, strike out the words "cooperating with the" and insert instead *engaging said drum;* and that the said Letters Patent should be read with this correction therein that the same may conform to the record of the case in the Patent Office.

Signed and sealed this 23d day of March, A. D. 1926.

[SEAL.]
M. J. MOORE,
*Acting Commissioner of Patents.*

Certificate of Correction.

It is hereby certified that in Letters Patent No. 1,574,253, granted February 23, 1926, upon the application of Porter S. Morgan, of Norwalk, Connecticut, for an improvement in "Power Brakes," an error appears in the printed specification requiring correction as follows: Page 4, line 5, claim 19, strike out the words "cooperating with the" and insert instead *engaging said drum;* and that the said Letters Patent should be read with this correction therein that the same may conform to the record of the case in the Patent Office.

Signed and sealed this 23d day of March, A. D. 1926.

[SEAL.]
M. J. MOORE,
*Acting Commissioner of Patents.*